Figure 1:
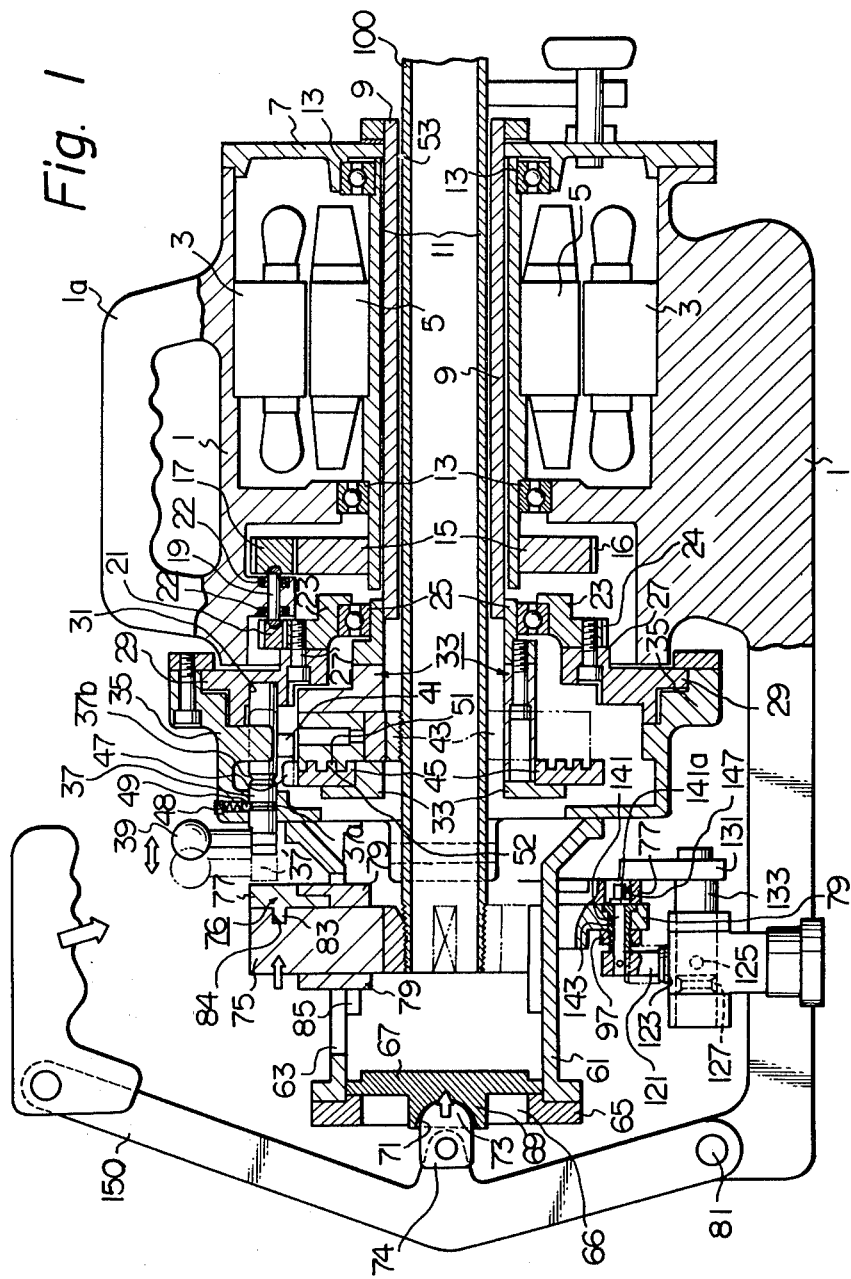

United States Patent [19]

Miyagawa et al.

[11] 4,279,182

[45] Jul. 21, 1981

[54] MACHINE TOOL

[75] Inventors: Fumiko Miyagawa; Yoshiharu Ikenaka; Makoto Sakaguchi, all of Osaka, Japan

[73] Assignee: Rex Industries Co., Ltd., Osaka, Japan

[21] Appl. No.: 92,581

[22] Filed: Nov. 8, 1979

[30] Foreign Application Priority Data

Dec. 1, 1978 [JP] Japan .................. 53-147758

[51] Int. Cl.³ .................. B23B 19/02; B23B 3/22
[52] U.S. Cl. .................. 82/28 R; 82/4 C
[58] Field of Search .................. 82/4 R, 4 C, 28 R

[56] References Cited

U.S. PATENT DOCUMENTS

| 1,185,681 | 6/1916 | Kienzle | 82/28 R |
| 1,863,202 | 6/1932 | Krohn | 82/28 R |
| 2,121,934 | 6/1938 | Snader et al. | 82/28 R |
| 4,133,230 | 1/1979 | Inaba et al. | 82/28 R |

FOREIGN PATENT DOCUMENTS 515562  11/1920  France .................. 82/28

Primary Examiner—Harrison L. Hinson
Attorney, Agent, or Firm—Merchant, Gould, Smith, Edell, Welter & Schmidt

[57] ABSTRACT

A machine tool for machining a blank, such as round bar, comprising an electric motor which includes a motor housing having an axial bore through which the blank can extend, an annular stator arranged in said motor housing, and an annular rotor arranged in and coaxially to the annular stator, a chucking device for clamping the blank which extends through the axial bore and the annular rotor, and at least one cutting tool for machining the blank, one of the chucking device and the cutting tool being mechanically and immovably connected to the motor housing and the other being mechanically and rotatably connected to the annular rotor.

9 Claims, 3 Drawing Figures

MACHINE TOOL

This invention relates to a machine tool for machining such as cutting, threading, grooving, chamfering or the like, of a blank such as a hollow or solid round bar or rod.

A machine tool for carrying out the above mentioned kinds of machining operations has usually an electric power motor to provide a relative rotation between the blank and cutting tool or tools. In a conventional known machine tool, even if it is of a type of a self-contained motor, a marketed motor itself is independently incorporated in the machine tool, so that it is always necessary to provide an output shaft on the motor so as to transmit the output rotation of the motor to a rotatable portion of the machine tool that is located outside the motor. That is, the motor always has an output shaft which projects outwards to be connected to, for example, a spindle of the machine through reduction gears. The presence of such an outwardly projecting output shaft is an obstacle for minimizing and lightening the machine, in particular a portable machine tool, thus resulting in a decreased facility of the operation of the machine.

The primary object of the invention is to provide a portable, simple and light machine tool in which a motor is made, not as an independent part, but as a part of the body of the machine tool and a blank can be inserted directly through the motor.

The conception of the direct insertion of a blank through a motor is quite novel.

Further properties of the invention will become apparent from the detailed description of the preferred embodiments presented below.

Figure 2:
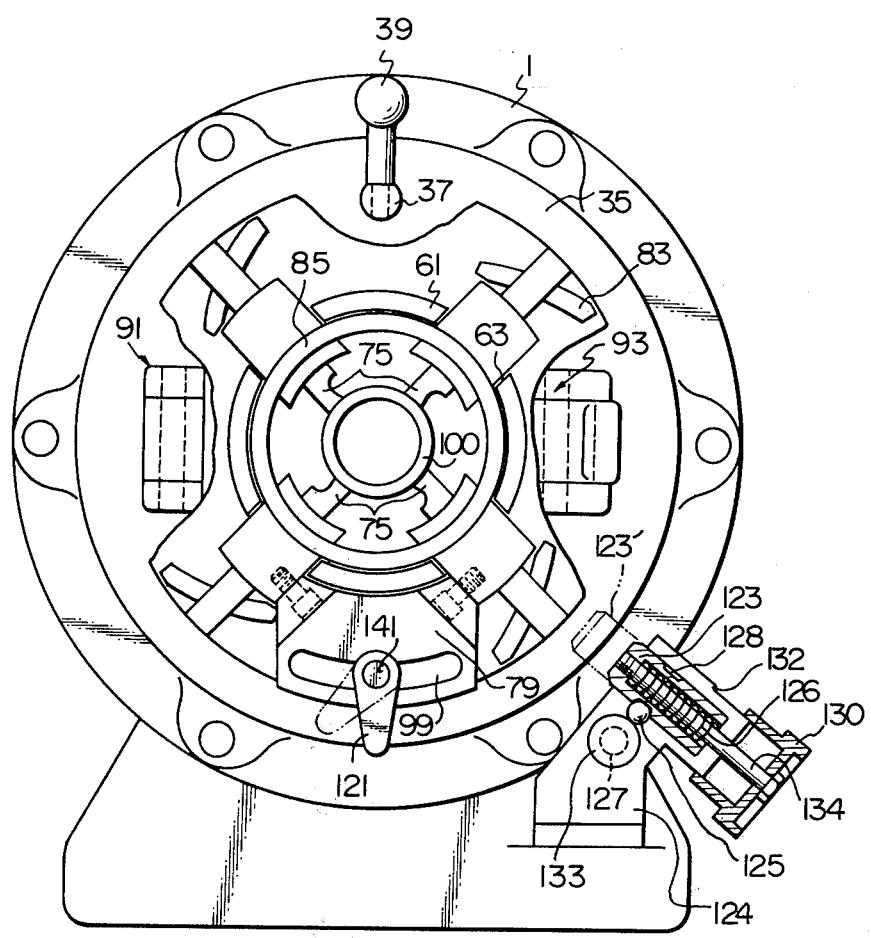
Figure 3:
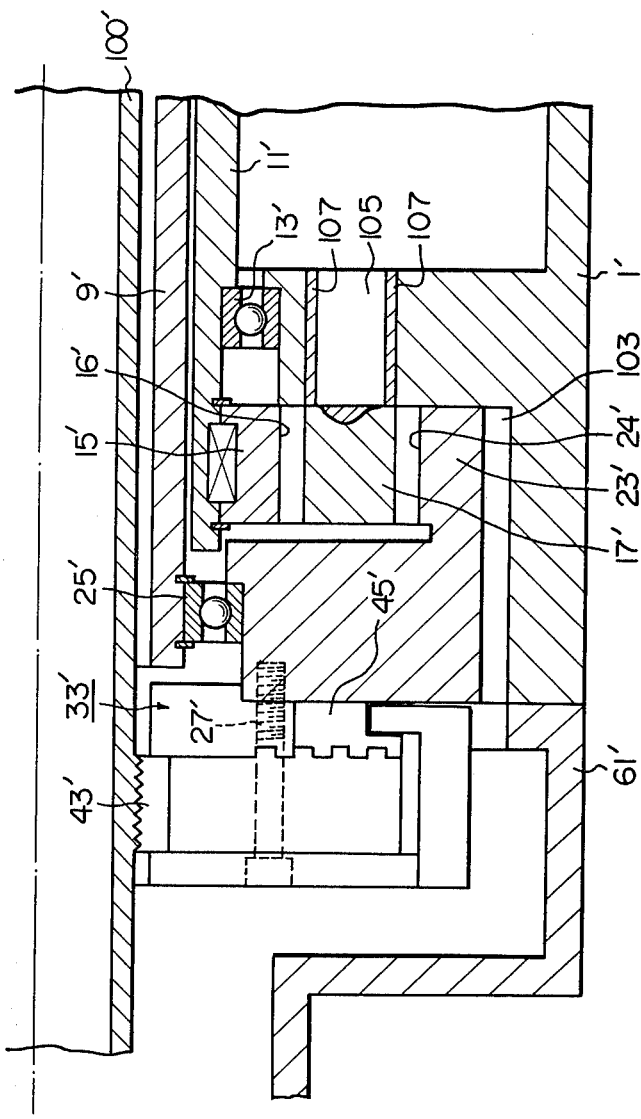

In the description of the preferred embodiments, reference is made to the accompanying drawings, in which:

FIG. 1 is a longitudinal sectional view of a machine tool according to the present invention, FIG. 2 is a partially sectioned left hand end view of FIG. 1, and, FIG. 3 is a view showing a part of another embodiment.

First, with reference to FIGS. 1 and 2, an annular stator 3 and an annular rotor 5 which form an electric motor are coaxially arranged in a motor housing 1 with a handle 1a. The stator 3 is secured to the motor housing 1, and the rotor 5 is rotatably arranged inside of the annular stator 3. The housing 1 has an axial centre bore 53, so that the center holes of the stator 3 and the rotor 5 have an axial center line identical to that of the center bore 53. A hollow inner cylinder 9 which is coaxial to the bore 53 is secured to an end plate 7 which is, in turn, secured to the housing 1. To the inner periphery of the rotor 5 is secured a hollow outer cylinder 11 which is rotatably fitted onto the outer periphery of the inner cylinder 9. The outer cylinder 11 is rotatably supported by bearings 13 attached to the housing 1. The stator 3 and the rotor 5 are in principle the same as those of, for example, a conventional known induction motor, so that the rotor 5 rotates relative to the stator 3.

To the front end of the outer cylinder 11 is connected by means of, for example, a key (not shown), an annular gear 15 which is provided, on its outer periphery, with outer teeth 16 and which is engaged by a gear 17. The gear 17 is secured to one end of a shaft 19 which is rotatably supported by bearings 22 provided in the housing 1. To the other end of the shaft 19 is secured a gear 21. The gears 15, 17 and 21 thus form a reduction gear mechanism.

A body of a chucking device 33 is attached to the front end, i.e. inner end of the inner cylinder 9 to chuck a blank which is to be machined and which is in the form of a pipe 100 in the illustrated embodiment. An annular gear 23 which is provided, on its outer periphery, with outer teeth 24, is rotatably mounted onto the chucking device 33, through bearings 25. To the side face of the annular gear 23 is secured an annular plate 29 by means of, for example, four set screws 27 (diametrically arranged two set screws only are illustrated) which are spaced, for example, at 90 degrees, so that the annular plate 29 can rotate together with the gear 23. The chucking device 33 may be, for example, a conventional known scroll chuck and can include a ring plate 45 having scroll-shaped cam projections 51 and chucking jaws 43 having scroll-shaped grooves 52 in which are fitted the corresponding cam projections 51, so that the rotation of the ring plate 45 causes the chucking jaws 43 to move in radial directions. As a result, the chucking jaws 43 can be radially moved to positively chuck the pipe 100 which extends through the bore 53 and accordingly through the center hole of the inner cylinder 9. Thus, any kind of pipes having different diameters can be chucked by the chucking jaws. A mechanism which ensures the rotational movement of the ring plate 45 will be discussed hereinafter.

The annular plate 29 has a recessed groove 31 having, for example, a circular cross section, in which is disengageably engaged one end of a round bar or pin 37. The pin 37 extends through and is slidably supported by a hollow mounting housing 35 which is rotatably connected to the annular plate 29. The pin 37 has positioning peripheral grooves 37a and 37b in which is selectively fitted a positioning ball 49 pressed by a spring 48 provided in the mounting housing 35. For example, when the ball 49 is fitted in the peripheral groove 37b, one end of the pin 37 comes out of the recessed groove 31, and when the ball is fitted in the peripheral groove 37a, one end of the pin 37 comes into the recessed groove 31. Therefore, when the pin 37 is fitted in the recessed groove 31, the mounting housing 35 is integrally connected to the annular plate 29 so as to rotate together therewith.

The pin 37 has a tongue projection 41, and the ring plate 45 of the chucking device has on its outer periphery has a U-shaped projection 47 which defines a U-shaped channel (not shown) in which the tongue projection 41 can be fitted. A non-operational position of the pin 37 in which the ball 49 engages the peripheral groove 37b corresponds to an operational position of the tongue projection 41 in which the projection 41 engages the U-shaped channel of the projection 47. As a result, the rotational movement of the pin 37 about its longitudinal axis with the help of a lever 39 secured to and provided on the pin 37 when the latter is in its non-operational position 37' designated by a dotted and dashed line in FIG. 1 causes the ring plate 45 to rotate in a clockwise direction or a counterclockwise direction, in order to radially move the chucking jaws 43, since the tongue projection 41 is engaged in the channel of the projection 47, in the non-operational position of the pin 37.

To the front face of the mounting housing 35 is attached a substantially cylindrical hollow support 61 for supporting cutting tools 75. The support 61 is, for example, hinged to the mounting housing 35 so that the support 61 can open on a hinge 91 (FIG. 2) provided on one side of the front face of the mounting housing 35. When the support 61 is closed, it can be easily locked on the housing 35 by a locking device 93 which is per se known and which is provided on the side of the front face of the housing 35 that is diametrically opposed to the hinge 91. The support 61 is provided, on its periphery, with a plurality of elongated holes 63, the number of which correspond to the number of the cutting tools 75 which are axially slidably supported in the corresponding elongated holes 63. The tools 75, which are chasers in the illustrated embodiment, are supported by conventional known scroll type tool holders 76. The tool holders 76 have a movable ring plate 77 having scroll-shaped cam projections 83 and a stationary ring plate 79 having an elongated arc-shaped hole 99 (FIG. 2) formed on the ring plate 79. The ring plate 77 can rotate relative to the stationary ring plate 79 within a range limited by the arc length of the holes 99 to radially move the corresponding chasers (cutting tools) 75, which have scroll-shaped recessed grooves 84 in which are engaged the cam projections 83 of the corresponding ring plate 77. Essentially, a single tool 75, a single elongated hole 63 and a single tool holder 76 are necessary. The relative rotation of the plate 77 to the plate 79 can be manually effected, for example, by an operator turning a knob 121 or a nut 97, which will be discussed hereinafter, to rotate the plate 77.

The knob 121 has an eccentric shaft 141 extending through the ring plate 79 into an elongated slot 147 formed in the ring plate 77. The eccentric shaft 141 is provided, on its periphery, with a threaded bush 143 which surrounds the eccentric shaft 141 and which is engaged by the nut 97. The eccentric shaft 141 can rotate within the bush 143 which is secured to the plate 79. The eccentric shaft 141 has an enlarged portion 141a which prevents the eccentric shaft 141 from coming out of the ring plate 79 and the slot 147.

When the chasers 75 are moved in a radial direction to a desired position in which the chasers 75 are brought into contact with the front end of the pipe 100, the nut 97 is fastened to lock the chasers 75 in their desired position. To the stationary ring plate 79 is secured a ring member 85 which is brought into contact with the inner periphery of the support 61, so that when the ring member 85 is pushed in an axial direction by a circular slide plate 67, which is described in detail later, the chasers 75 are moved in an axial direction designated by an arrow in FIG. 1, in the corresponding elongated holes 63.

The front end opening of the support 61 is closed by an annular end plate 65 having a center opening 66 through which a boss 69 of the slide plate 67 extends outwards. The slide plate 67 is, for example, in the form of a disc, so that it can axially slide on the inner periphery of the support 61 while contacting with the inner periphery of the support. The center boss 69 formed on the slide plate 67 has a center semi-spherical recess 71.

To the front end of the motor housing 1 is pivotally connected a handle 150 through a pivot pin 81. The handle 150 is provided, at its substantially center portion, with a pusher 74 having a semi-spherical projection 73. Therefore, even during the rotational movement of the slide plate 67, the semi-spherical projection 73 can be fitted in the corresponding semi-spherical recess 71 to push and move the slide plate 67 in an axial direction designated by an arrow in FIG. 1. The chasers 75 can be axially moved by the slide plate 67 which comes into contact with the ring member 85.

The machine as constructed above, according to the present invention operates as follows.

The pin 37 is withdrawn in advance from the recessed groove 31 to make it possible to insert the pipe 100 into the bore 53 and to chuck the same. That is, the pin 37 is brought into its non-operational position in which the ball 49 is engaged in the peripheral groove 37b. In the non-operational position of the pin 37, the tongue projection 41 is in its operational position in which it comes into the channel of the projection 47 of the ring plate 45. When the housing 35 is rotated to rotate the ring plate 45, the chucking jaws 43 are pressed onto the pipe 100 to chuck the latter.

After the pipe 100 is completely chucked by the chucking jaws 43, the pin 37 is pushed in an axial direction, so that the one end of the pin 37 comes into the recessed groove 31. Then, a motor switch (not shown) is turned ON to rotate the rotor 5. The rotation of the rotor 5 is transmitted to the outer cylinder 11 and is reduced by the reduction device consisting of the gears 15, 17, 21 and 23. The reduced rotation is further transmitted to the annular plate 29 and to the mounting housing 35 via the pin 37 which is in its operational position. Since the support 61 is integral with the housing 35, the rotation of the housing 35 causes the support 61 to rotate together therewith, thus resulting in rotating the chasers 75 about the pipe 100. After that, an operator operate the handle 150 to press the semi-spherical projection 73 of the pusher 74 against the corresponding semi-spherical recess 71, thereby to axially move the chasers 75 until the teeth of the chasers 75 are thrust into the front end of the pipe 100. Once the chasers' teeth are thrust into the pipe 100, the chasers are further automatically thrust into the pipe 100 due to lead angles provided on the chasers' teeth, so that, for example, a desired taper thread is formed on the pipe 100 by the chasers 75. The ring plate 79 continues to axially move together with the chasers 75 during the development of the cutting operation. When a desired length of taper thread is formed on the pipe 100, the ring plate 77 comes into contact with a tool retracting lever 131 secured to a slide shaft 133 which is slidably supported by a base 124, provided on the housing 1. The slide shaft 133 has a peripheral groove 127 in which can be fitted a ball 125 arranged between the slide shaft 133 and a slider 123 which is movably supported by the base 124. The ball 125 is normally fitted in a periphery groove 128 of the slider 123. The slider 123 is always pressed by a compression spring 126 toward its operational position 123' designated by a dotted and dashed line in FIG. 2, but is held at its non-operational position by the engagement of the ball 125 and the periphery groove 128. When the tool retracting lever 131 and accordingly the slide shaft 133 are moved in a right hand direction in FIG. 1 by the ring plate 79, the ball 125 comes into the periphery groove 127, so that the ball 125 comes out of the periphery groove 128. As soon as the ball 125 comes out of the groove 128, the slider 123 is suddenly moved forward by the spring 126 to its operational position. The movement of the slider 123 is stopped when a cap 130 which is connected to the slider 123 by means of a bolt 134 screwed in the slider 123 and which is slidable on the base 124 comes into contact with a shoulder 132 formed on the base 124. As a result, a knob 121 having the eccentric shaft 141 is rotated by the projected slider 123, so that the ring plate 77 which is engaged by the eccentric shaft 141 is suddenly rotated. Consequently, the chasers 75 are rapidly retracted from their working positions to their non-working positions by the cam projections 83 of the ring plate 77 and the recessed grooves 84 of the chasers 75. The threading operation by the chasers 75 are thus completed.

In a case where the pipe 100 has a short length so that the pipe 100 cannot be inserted from the rear end of the motor housing 1, into the housing 1 to be chucked by the chucking device 33, the pipe 100 can be easily inserted from the front end of the motor housing 1 after the cylindrical support 61 is opened on the hinge 91 to expose the front face of the mounting housing 35, as mentioned above. It should be noted that although the provision of the opening mechanism of the support 61 on the hinge 91 provided on one side of the front face of the mounting housing 35 is not always necessary to achieve the object of the invention, the opening mechanism is useful particularly when the blank to be machined has a very short length.

The reduction gear mechanism is not limited to an illustrated type of gearing, but may be of a type of an epicyclic gearing or a harmonic reduction gearing.

The embodiment illustrated in FIGS. 1 and 2 is directed to a machine in which the blank is stationary and the tools can rotate about the blank. Another embodiment in which the blank can rotate and the tools are stationary is illustrated in FIG. 3. Parts or elements designated by primed numerals in FIG. 3 correspond to those designated by the same numerals with no prime in FIGS. 1 and 2.

In FIG. 3, the annular gear 15' having outer teeth 16' is keyed to the front end of the outer cylinder 11' and is engaged by the idle gear 17' which is, in turn, engaged by the annular gear 23' having inner teeth 24'. The annular gear 23' is rotatably supported by the bearings 25' on the stationary inner cylinder 9'. The annular gear 23' is secured to the chucking device body 33' by means of the set screws 27'. The numeral 103 designates a metal bush arranged between the annular gear 23' and the motor housing 1'. A shaft 105 which is connected to the idle gear 17' to support the same is rotatably supported by a metal bush 107 in the motor housing 1'.

The rotation of the outer cylinder 11' is reduced and transmitted to the chucking device 33' by means of the gear 15', the idle gear 17', and the annular gear 23', so that the pipe 100' can be rotated. Since it is not necessary to rotate the tools in the embodiment illustrated in FIG. 3, the support 61' can be mounted on the motor housing 1' preferably in such a way that it can open on a hinge (not shown), as in the embodiment in FIGS. 1 and 2. Since no special mechanism for moving the chucking jaws 43' in radial direction is provided in the embodiment in FIG. 3, unlike the first embodiment, the ring plate 45' can be manually and directly rotated to radially move the chucking jaws 43' for chucking the pipe 100 after the support 61' is opened on the hinge.

As can be seen from the above discussion, according to the invention, the motor forms an integral part of a machine tool and the blank to be machined can be directly inserted into the motor portion. This results in the provision of a simplified, small and light machine tool. Furthermore, the machine tool of the present invention is portable due to the presence of the handle 1a.

What is claimed is:

1. A machine tool for machining a blank, such as a solid or hollow round bar, comprising an electric motor which includes a motor housing having an axial bore through which said blank can extend, an annular stator arranged in said motor housing, and an annular rotor arranged in and coaxially to said annular stator, a chucking device for clamping said blank which extends through said axial bore and said annular rotor, and at least one cutting tool for machining the blank, one of said chucking device and said at least one cutting tool being mechanically immovably connected to said motor housing and the other being mechanically and rotatably connected to said annular rotor; and a hollow outer cylinder which is coaxially connected to said annular rotor so as to rotate together therewith and a hollow inner cylinder which is immovably connected to said motor housing and which is arranged in and coaxially to said outer cylinder, said chucking device being connected to said inner cylinder, said at least one cutting tool being mechanically connected to said rotatable outer cylinder so as to rotate together therewith.

2. A machine tool according to claim 1, comprising a mounting housing which carries at least one tool holder for holding said at least one cutting tool and which can be connected to said outer cylinder so as to rotate together therewith.

3. A machine tool according to claim 2, comprising a means for connecting and disconnecting said mounting housing to and from said outer cylinder, so that said mounting housing can be rotated by said outer cylinder only when the mounting housing is connected to the outer cylinder, and that said mounting housing is otherwise rotatable independently of said outer cylinder.

4. A machine tool according to claim 3, wherein said means comprises an engagement member which can selectively engage said chucking device to operate the same and thereby to chuck said blank.

5. A machine tool according to claim 2, 3 or 4, comprising a supporting means attached to said mounting housing for movably supporting said at least one tool holder in axial directions of said bore.

6. A machine tool according to claim 5, wherein said supporting means comprises a hollow cylinder which is, at its one side, hinged to said mounting housing so that said hollow cylinder can open on the hinge.

7. A machine tool according to claim 5, comprising a means provided on said supporting means for pressing said at least one tool holder to move the latter in a radial direction of the bore and thereby to cause said at least one cutting tools to come into a thrust engagement into the front end of the blank.

8. A machine tool according to claim 5, comprising a means for automatically retracting said at least one cutting tool when the machining operation is completed.

9. A machine tool for machining a blank, such as a solid or hollow round bar, comprising an electric motor which includes a motor housing having an axial bore through which said blank can extend, an annular stator arranged in said motor housing, and an annular rotor arranged in and coaxially to said annular stator, a chucking device for clamping said blank which extends through said axial bore and said annular rotor, and at least one cutting tool for machining the blank, one of said chucking device and said at least one cutting tool being mechanically immovably connected to said motor housing and the other being mechanically and rotatably connected to said annular rotor; and a hollow outer cylinder which is coaxially connected to said annular rotor so as to rotate together therewith and a hollow inner cylinder which is immovably connected to said motor housing and which is arranged in and coaxially to said outer cylinder, said at least one cutting tool being connected to said motor housing, said chucking device being mechanically connected to said rotatable outer cylinder so as to rotate together therewith.

* * * * *